United States Patent
Hasbe et al.

(10) Patent No.: US 9,336,103 B1
(45) Date of Patent: May 10, 2016

(54) USING A NETWORK BUBBLE ACROSS MULTIPLE HOSTS ON A DISASTER RECOVERY SITE FOR FIRE DRILL TESTING OF A MULTI-TIERED APPLICATION

(71) Applicant: Symantec Corporation, Mountain View, CA (US)

(72) Inventors: Sunil Hasbe, Shirur Anantpal (IN); Hermesh Gupta, Bhopal (IN); Mandar Kashelikar, Pune (IN)

(73) Assignee: Veritas US IP Holdings LLC, Mountain View, CA (US)

( * ) Notice: Subject to any disclaimer, the term of this patent is extended or adjusted under 35 U.S.C. 154(b) by 183 days.

(21) Appl. No.: 14/242,871

(22) Filed: Apr. 2, 2014

(51) Int. Cl.
*G06F 11/00* (2006.01)
*G06F 11/20* (2006.01)

(52) U.S. Cl.
CPC .......... *G06F 11/2033* (2013.01); *G06F 11/203* (2013.01); *G06F 11/2023* (2013.01)

(58) Field of Classification Search
CPC ............ G06F 11/2023; G06F 11/2025; G06F 11/203; G06F 11/2033
USPC .......................................................... 714/6.3
See application file for complete search history.

(56) References Cited

U.S. PATENT DOCUMENTS

| | | | | |
|---|---|---|---|---|
| 2012/0174112 A1* | 7/2012 | Vaidya | .................. | G06F 9/4856 718/104 |
| 2013/0198739 A1* | 8/2013 | Razdan | ............... | G06F 9/45558 718/1 |
| 2014/0003284 A1* | 1/2014 | Doyle | ..................... | H04L 67/10 370/254 |
| 2014/0040206 A1* | 2/2014 | Ramakrishnan | .... | G06F 11/2097 707/640 |

OTHER PUBLICATIONS

Shanks, Eric, "Virtual Routing for Bubble Networks", Apr. 18, 2012, http://theithollow.com/2012/04/18/virtual-routing-for-bubble-networks/.*

* cited by examiner

*Primary Examiner* — Chae Ko
(74) *Attorney, Agent, or Firm* — Campbell Stephenson LLP

(57) ABSTRACT

A DR site is maintained containing multiple VMs distributed across multiple hosts to which a multi-tiered application can be failed over from a production site. A network bubble is created in which the multi-tiered application can be fire drill tested without conflicting with the production instance. Each VM is cloned, and cloned VMs communicate using private IP addresses. A virtual switch is created on each host, and configured for cloned VM communication. On each host, a virtual router is configured with both a public virtual adapter and a private virtual adapter. The source VMs communicate using public IP addresses over the physical channel, via the external virtual switches on the hosts, and are available for failover from the production site. The cloned VMs communicate using private IP addresses via the virtual switches and private virtual adapters of the virtual routers, thereby forming the network bubble.

20 Claims, 4 Drawing Sheets

USING A NETWORK BUBBLE ACROSS MULTIPLE HOSTS ON A DISASTER RECOVERY SITE FOR FIRE DRILL TESTING OF A MULTI-TIERED APPLICATION

TECHNICAL FIELD

This disclosure pertains generally to providing high availability and disaster recovery for information technology application services, and more specifically to using a network bubble across multiple hosts on a disaster recovery site for fire drill testing of a multi-tiered application, while continuing to run the multi-tiered application on the production site with the disaster recovery site remaining available for site-level failover.

BACKGROUND

Clusters are groups of computers that use groups of redundant computing resources in order to provide continued service when individual system components fail. More specifically, clusters eliminate single points of failure by providing multiple servers, multiple network connections, redundant data storage, etc. Clustering systems are often combined with storage management products that provide additional useful features, such as journaling file systems, logical volume management, multipath input/output (I/O) functionality, etc.

In a high-availability clustering system, the failure of a server (or of a specific computing resource used thereby such as a network adapter, storage device, etc.) is detected, and the application that was being run on the failed server is automatically restarted on another computing system. This process is called "failover." The high-availability clustering system can also detect the failure of the application itself, and make it failover the application to another node. In effect, the high-availability clustering system monitors applications, the servers the applications run on, and the resources used by the applications, to ensure that the applications remain highly available.

Virtualization of computing devices can be employed in high availability clustering and in other contexts. One or more virtual machines (VMs or guests) can be instantiated at a software level on physical computers (host computers or hosts), such that each VM runs its own operating system instance. Just as software applications, including enterprise-level applications such as databases, ecommerce engines and web servers, can be run on physical computers, so too can these applications be run on virtual machines. VMs can be deployed such that applications being monitored by the high-availability clustering system run on and are failed over between VMs, as opposed to physical servers. An application being provided with high availability can be run on a virtual machine which is in turn running on a host in a high-availability cluster. The virtual machine provides desired mobility and isolation of the application, whereas the underlying high-availability cluster provides highly available computing infrastructure. In some virtualization scenarios, the host itself is in the form of a VM (i.e., a virtual host) running on another (e.g., physical) host.

In some virtualization scenarios, a software component often called a hypervisor can act as an interface between the VMs and the host operating system for some or all of the functions of the VMs. In other virtualization implementations, there is no underlying host operating system running on the physical, host computer. In those situations, the hypervisor acts as an interface between the VMs and the hardware of the host computer, in effect functioning as the host operating system, on top of which the VMs run. Even where a host operating system is present, the hypervisor sometimes interfaces directly with the hardware for certain services.

Contemporary business applications are rarely islands unto themselves, but instead are usually part of a multi-tier application stack. For example a solution for providing ecommerce application services might require three separate applications: a database, an ecommerce engine and a web service. Not so long ago it would have been standard to deploy these three components on a single server. As datacenters have evolved, there has been a move away from the single server model, in order to provide greater scalability and more flexibility at lower cost. Because different tiers of the business application service have different requirements, it is desirable to run the multiple tiers on multiple servers (either virtual, physical or a combination of the two), sometimes under different operating systems, using different virtualization platforms and/or according to different configurations as desired. In the above ecommerce application service example, the web service application, the ecommerce application and the database application could all be run on a separate virtual or physical server under different a operating system, using different levels of virtualization provided by different virtualization platforms, and with different resource requirements as desired. In effect, the different tiers of the application service are separated, and as such can be implemented within entirely different environments.

Not only can local servers or other components within a given a datacenter fail, but disastrous events can also cause the failure of an entire datacenter. For this reason, some high availability clustering and storage systems extend into wide-area clusters that support failover between separate clusters located at physically disparate datacenters (this can be thought of as a production site and a disaster recovery site, although in practice sometimes more than two physical sites are involved). Communication is established between the cluster at the production site and the one at the disaster recovery site over a network, the groups of resources used by the supported applications are maintained on both clusters, and data from the production cluster is replicated to the secondary cluster. Thus, not only can an individual application be failed over between servers within a cluster in response to a local server failure or similar event, but applications can be failed over between clusters in the event of a datacenter-level failure.

Where a disaster recovery site is used to replicate a production site on which high availability applications are run, it is important to validate that a wide-area failover between sites will be successful when needed. To do so, the applications are brought up on the disaster recovery site from time to time, to test the disaster recovery configuration and ensure that if the production site fails, the applications can be successfully failed over to the disaster recovery site. Such a level of testing is called a fire drill.

Conventionally, while such a test is being run on the disaster recovery site, the disaster recovery site should not bring up the applications on the same physical channel as primary site. This is because both the production and disaster recovery sites are connected to the same physical channel, and bringing up the applications on the disaster recovery site while the applications are running on the production site will result in DNS and IP address conflicts, as well as cross talk between the copies of the applications running on the different sites. This problem is exacerbated in the case of multi-tiered applications which run on multiple hosts. Furthermore, conventional solutions for testing an application on a disaster recovery site while the application is running on the production site are limited to specific virtualization providers (e.g., VMware, Hyper-V, etc.). In a multi-tiered scenario, different virtualization products can be used on different tiers, and thus fire drill solutions that are not agnostic to the virtualization environment are not adequate in the case of a multi-tiered application that uses multiple virtualization platforms. Further complexity is added by the fact that different tiers of a multi-tiered application run on different (physical and/or virtual) hosts, whereas conventional fire drill solutions do not support failover of applications distributed across multiple hosts.

It would be desirable to address these issues.

SUMMARY

A production site is maintained containing multiple virtual machines distributed across multiple host computers on which a first instance of a multi-tiered application executes. Individual tiers of the application can be configured for execution on a single virtual machine running on a single host computer, can be distributed across multiple host computers and/or can be distributed across multiple virtual machines running on a single hypervisor on a single host computer. A physically disparate disaster recovery site is maintained which contains corresponding multiple virtual machines distributed across corresponding multiple host computers, to which the multi-tiered application can be failed over in the event of a disaster level failure at the production site. The production site and the disaster recovery site are communicatively coupled over a physical channel. A network bubble is created at the disaster recovery site to enable a second instance of the multi-tiered application to be brought up, executed and fire drill tested, while continuing to execute the first instance of the multi-tiered application on the production site, with the disaster recovery site simultaneously remaining available for failover of the multi-tiered application from the production site.

To create the network bubble, each virtual machine executing on each host computer on the disaster recovery site that is being maintained to failover the multi-tiered application from the production site is cloned. A virtual machine can be cloned by, for example, taking a read-only snapshot of a source virtual machine, and using copy of write to bring-up the cloned virtual machine. Cloning a virtual machine executing on a host computer results in a source virtual machine and a corresponding cloned virtual machine both executing on the host computer. On each host computer on the disaster recovery site on which at least one virtual machine is cloned, a virtual switch is created and configured for cloned virtual machines to communicate with each other without being visible on the physical channel.

A cloned virtual machine inherits a copy of the virtual adapter with public IP address configured for communicating on the physical channel from its corresponding source virtual machine. However, cloned virtual machines do not communicate externally using their inherited virtual adapters with the public IP addresses. Instead, for each cloned virtual machine, a second virtual adapter is created with a private IP address not visible on the physical channel. Cloned virtual machines communicate externally using these second virtual adapters with private IP addresses. Applications execute unmodified on the cloned virtual machines, such that the applications use the first virtual adapter and the public IP address for network communication. However, network communication is intercepted from a point in the network protocol stack below the application level (e.g., at the adapter level), public IP addresses in outgoing network communication are converted to the private IP addresses, vice versa in incoming network communication, and the second virtual adapter is used for the actual external communication.

On each host computer on the disaster recovery site on which at least one virtual machine is cloned, a virtual router is configured with both a public virtual adapter that has a public IP address and is visible on the physical channel, and with a private virtual adapter that has a private IP address that is not visible on the physical channel. The public virtual adapter of the virtual router is communicatively coupled to the physical channel, whereas the private virtual adapter of the virtual router is communicatively coupled to the private virtual switch created on the given host computer 210 for cloned VMs. A virtual router can be in the form of, e.g., a Linux virtual machine suitably configured to perform address translation on packets moving between public and private networks. One of its network adapters provides connectivity to the public network whereas the other is connected to the private network bubble in which the cloned virtual machines reside.

The multiple source virtual machines distributed across the multiple host computers on the disaster recovery site are configured to communicate with each other using the public IP addresses over the physical channel, via the public virtual adapters and public virtual switches, and thus are visible on the physical channel and are available for the failover of the multi-tiered application from the production site. The multiple cloned virtual machines distributed across the multiple host computers on the disaster recovery site are configured to communicate with each other using the private IP addresses via the virtual switches and private virtual adapters of the virtual routers. This forms a network bubble on the disaster recovery site which is not visible on the physical channel. Each virtual router on each host computer is configured to route packets between source host computers on the physical channel and to simultaneously route packets between the cloned virtual machines in the network bubble.

The virtual routers can be configured with firewall settings to allow cloned virtual machines executing in the network bubble to make read-only queries to specific, approved servers outside of the network bubble (e.g., an LDAP authentication server). The network traffic between a virtual machine in the network bubble making such a query and the approved outside server is routed according to the firewall settings, with the virtual router translating private IP address of the packets originating from the network bubble to its own public IP address and performing reverse translation on the response packets. The virtual routers can also be configured with firewall settings to allow cloned virtual machines executing in the network bubble to communicate with a fire drill monitoring and control application executing outside of the network bubble. In addition, virtual router can optionally have domain name service functionality to provide host name resolution for the cloned virtual machines within the network bubble, thereby preventing hostname conflicts with entities outside of the network bubble.

The above-described functionality enables a second instance of the multi-tiered application to be brought-up, executed and fire drill tested on the cloned virtual machines in the network bubble. The second instance of the multi-tiered application and the cloned virtual machines are not visible on the physical channel. The cloned virtual machines in the network bubble communicate with each other using the private IP addresses via the virtual switches and private virtual adapters of the virtual routers, thereby preventing IP address conflicts with entities outside of the network bubble and preventing crosstalk between the second instance of the multi-tiered application executing in the network bubble and the first instance of the multi-tiered application. A virtual router can receive a request from the fire drill monitoring and control application executing outside of the network bubble to run a fire drill test of the multi-tiered application in the network bubble, and the test can be started in the network bubble in response. Status information concerning the execution and testing of the second instance of the multi-tiered application on the cloned virtual machines in the network bubble can be transmitted through the virtual routers to the fire drill monitoring and control application executing outside of the network bubble, thereby providing realtime monitoring of the fire drill test.

In response to a disaster level failure of the production site, the first instance of the multi-tiered application can be failed over from the production site to the multiple source virtual machines distributed across the multiple host computers on the disaster recovery site. The first instance of the multi-tiered application can be executed on the source virtual machines on the host computers on the disaster recovery site, wherein the source virtual machines communicate with each other using the public IP addresses over the physical channel, via the public virtual adapters, and the first instance of the multi-tiered application is thus available to outside consumers. Simultaneously, the second instance of the multi-tiered application can continue to execute on the disaster recovery site in the network bubble.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
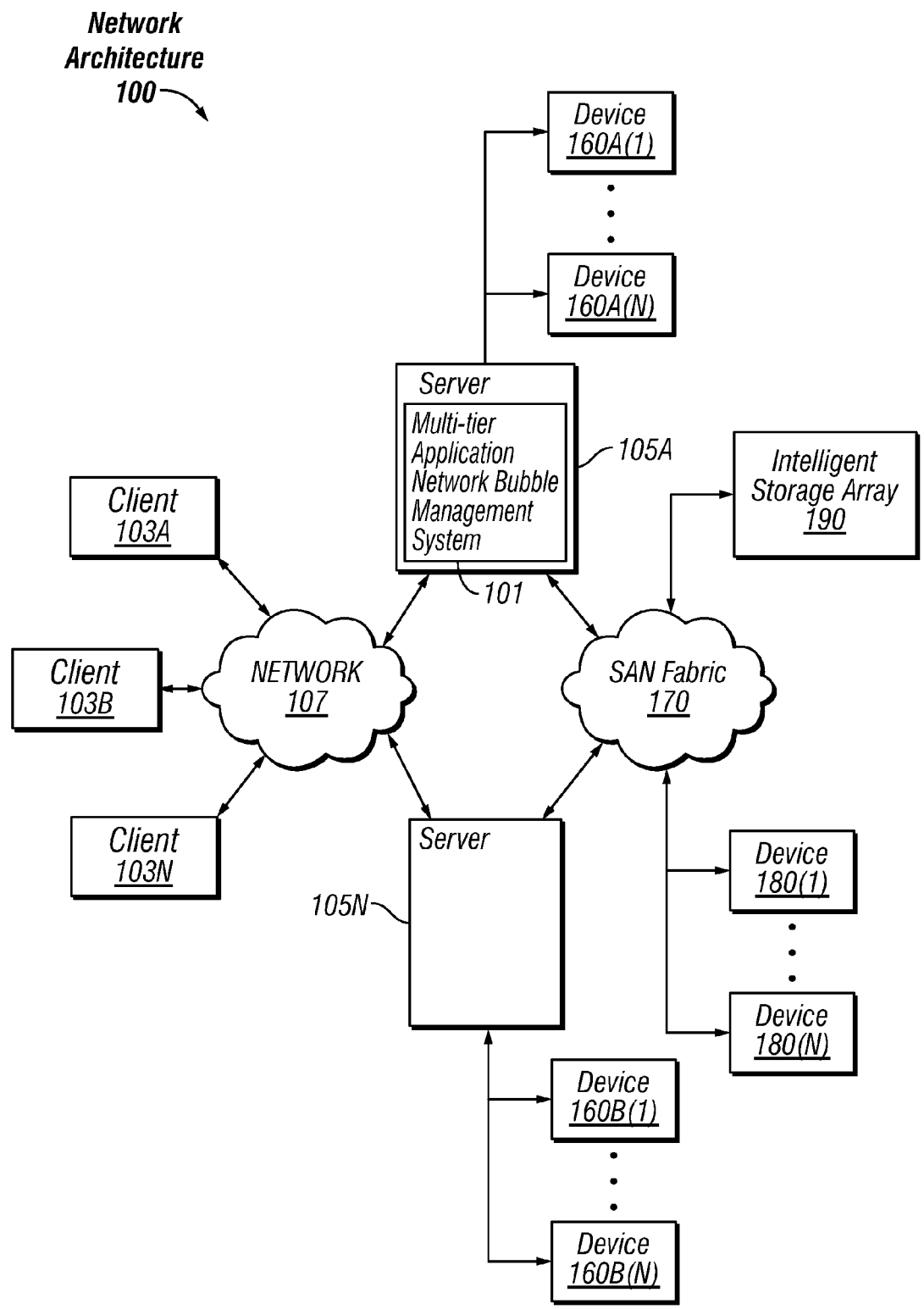
FIG. 1 is a block diagram of an exemplary network architecture in which a multi-tier application network bubble management system can be implemented, according to some embodiments.

FIG. 1 is a block diagram illustrating an exemplary network architecture 100 in which a multi-tier application network bubble management system 101 can be implemented. In the illustrated network architecture 100, client systems 103A, 103B and 103N, as well as servers 105A and 105N, are communicatively coupled to a network 107. A multi-tier application network bubble management system 101 is illustrated as residing on server 105A, but it is to be understood that in different embodiments the multi-tier application network bubble management system 101 can reside on different computers 210, or be distributed between multiple computing systems as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. Clients 103 can be in the form of, for example, desktop computers, laptop computers, or handheld or wearable mobile computing devices, comprising portable computer systems capable of connecting to a network 107 and running applications.

Although FIG. 1 illustrates three clients 103A-N and two servers 105A-N as an example, in practice many more (or fewer) computers can be deployed. In one embodiment, the network 107 is in the form of the internet. Other networks 107 or network-based environments can be used in other embodiments.

Figure 2:
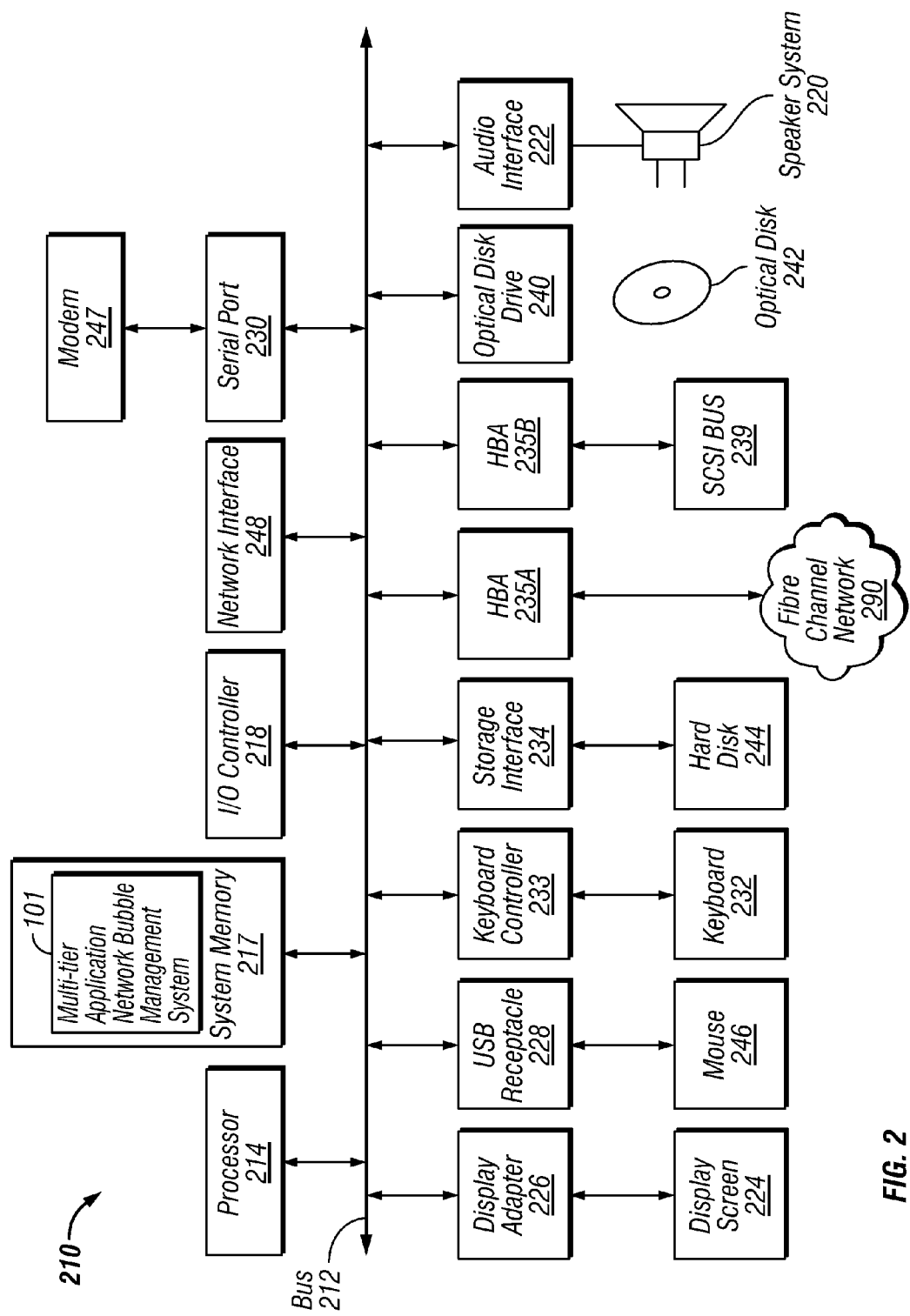
FIG. 2 is a block diagram of a computer system suitable for implementing a multi-tier application network bubble management system, according to some embodiments.

FIG. 2 is a block diagram of a computer system 210 suitable for implementing a multi-tier application network bubble management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the multi-tier application network bubble management system 101 is illustrated as residing in system memory 217. The workings of the multi-tier application network bubble management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
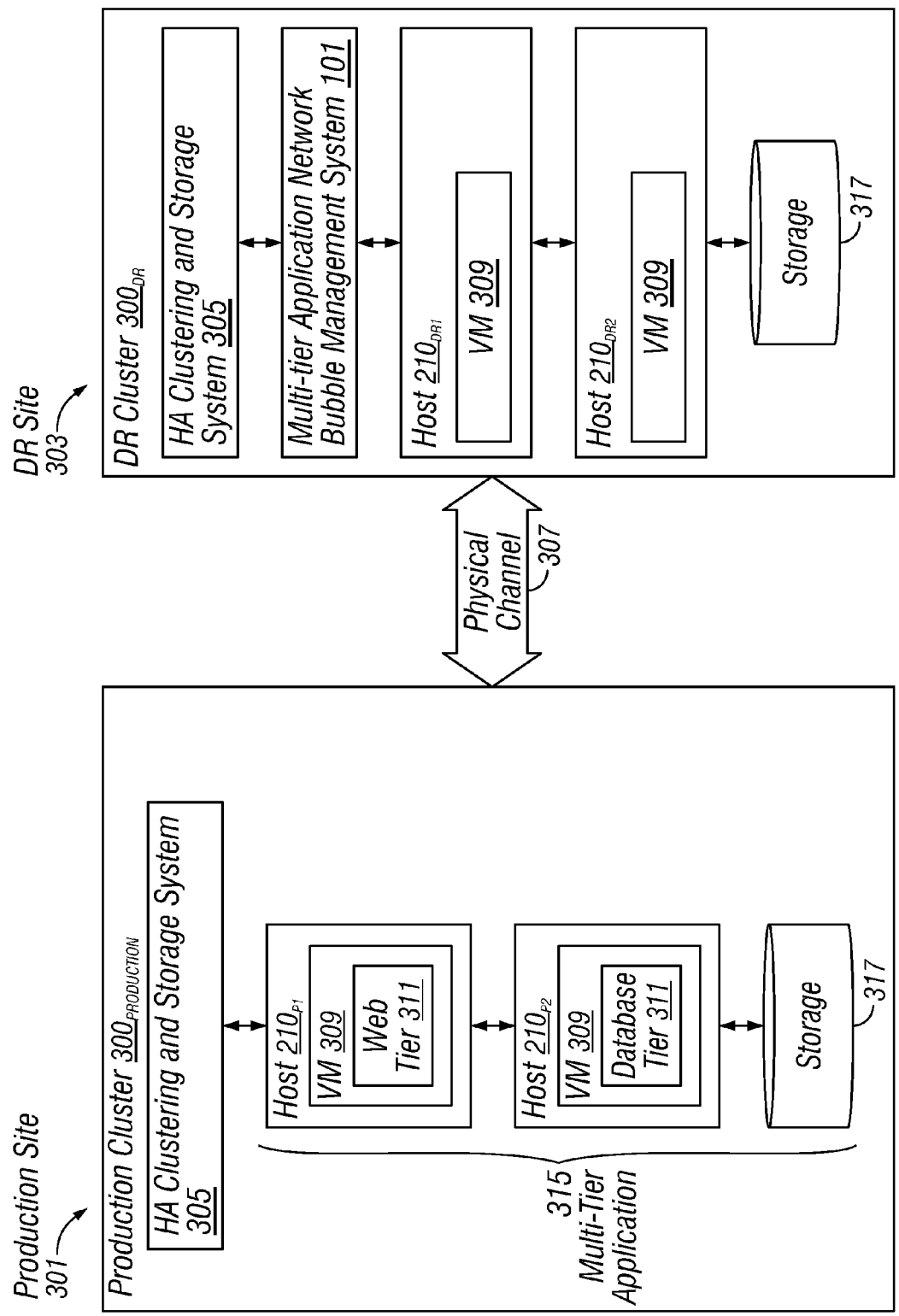
FIG. 3 is a high level block diagram of the operation of a multi-tier application network bubble management system within a high availability cluster, according to some embodiments.

FIG. 3 shows a high level overview of the operation of a multi-tier application network bubble management system 101 according to some embodiments. FIG. 3 illustrates a production site 301 and a disaster recovery (DR) site 303. A production cluster $300_{PRODUCTION}$ is instantiated on the production site 301 in the context of a high-availability clustering and storage system 305. For efficiency of illustration and explanation, the clustering and storage system 305 is illustrated as a centralized component. It is to be understood that, in practice, the clustering and storage system 301 contains components that are distributed throughout the cluster 300. A physically separate DR cluster $300_{DR}$ is instantiated on the DR site 303.

The example production cluster $300_{PRODUCTION}$ illustrated in FIG. 3 comprises two host computers 210, each running one VM 309. Although FIG. 3 depicts only two host computers $210_{P1}$ and $210_{P2}$, each running a single VMs 309, it is to be understood that in different embodiments clusters 300 can contain (up to orders of magnitude) more VMs 309 and physical computer systems 210 as desired. In FIG. 3, the VM 309 running on host $210_{P1}$ contains the web tier 311 of a multi-tiered application 315 and the VM 309 running on host $210_{P2}$ contains the database tier 313. Although the multi-tiered application 315 illustrated in FIG. 3 contains only two tiers, it is to be understood that multi-tiered applications 315 can contain more than two tiers in other embodiments. The storage 317 used by the multi-tiered application 315 is illustrated as a single entity, but it is to be understood that in practice this would typically be implemented with multiple underlying physical storage devices, which are managed by the clustering and storage system 305 so as to appear as a single storage device to computer systems 210 accessing the storage 317.

As illustrated in FIG. 3, the production site 301 and the DR site 303 are communicatively coupled through a physical channel 307 (e.g., the internet or a dedicated cabling infrastructure). For efficiency of illustration and explanation, the DR cluster $300_{DR}$ is also illustrated as comprising two host computers $210_{DR1}$ and $210_{DR2}$, each running one VM 309, although it is to be understood that clusters 300 can have larger and more complicated architectures. Replication functionality of the clustering and storage system 305 is used to replicate the storage 317 used by the multi-tier application 315 from the production cluster $300_{PRODUCTION}$ to the DR $300_{DR}$ cluster. The replicated storage includes operational representations of each tier of the multi-tier application 315, including information concerning the groups of resources used thereby and both intra-tier and inter-tier start/stop procedures and dependencies. Thus, the multi-tier application 315 can be brought up on the DR cluster $300_{DR}$ at the DR site 303 should be production site 301 fail.

FIG. 3 illustrates the multi-tier application network bubble management system 101 as a centralized component of the DR cluster $300_{DR}$. It is to be understood that in different embodiments, the functionalities of the multi-tier application network bubble management system 101 can reside on a server 105, client 103, or be distributed between multiple computer systems 210, including within a cloud-based computing environment in which the functionality of the multi-tier application network bubble management system 101 is provided as a service over a network 107. It is to be understood that although a multi-tier application network bubble management system 101 is illustrated in FIG. 3 as a single entity, the illustrated multi-tier application network bubble management system 101 represents a collection of functionalities, which can be instantiated as a single or multiple modules as desired. It is to be understood that the modules of the multi-tier application network bubble management system 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the multi-tier application network bubble management system 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

Figure 4:
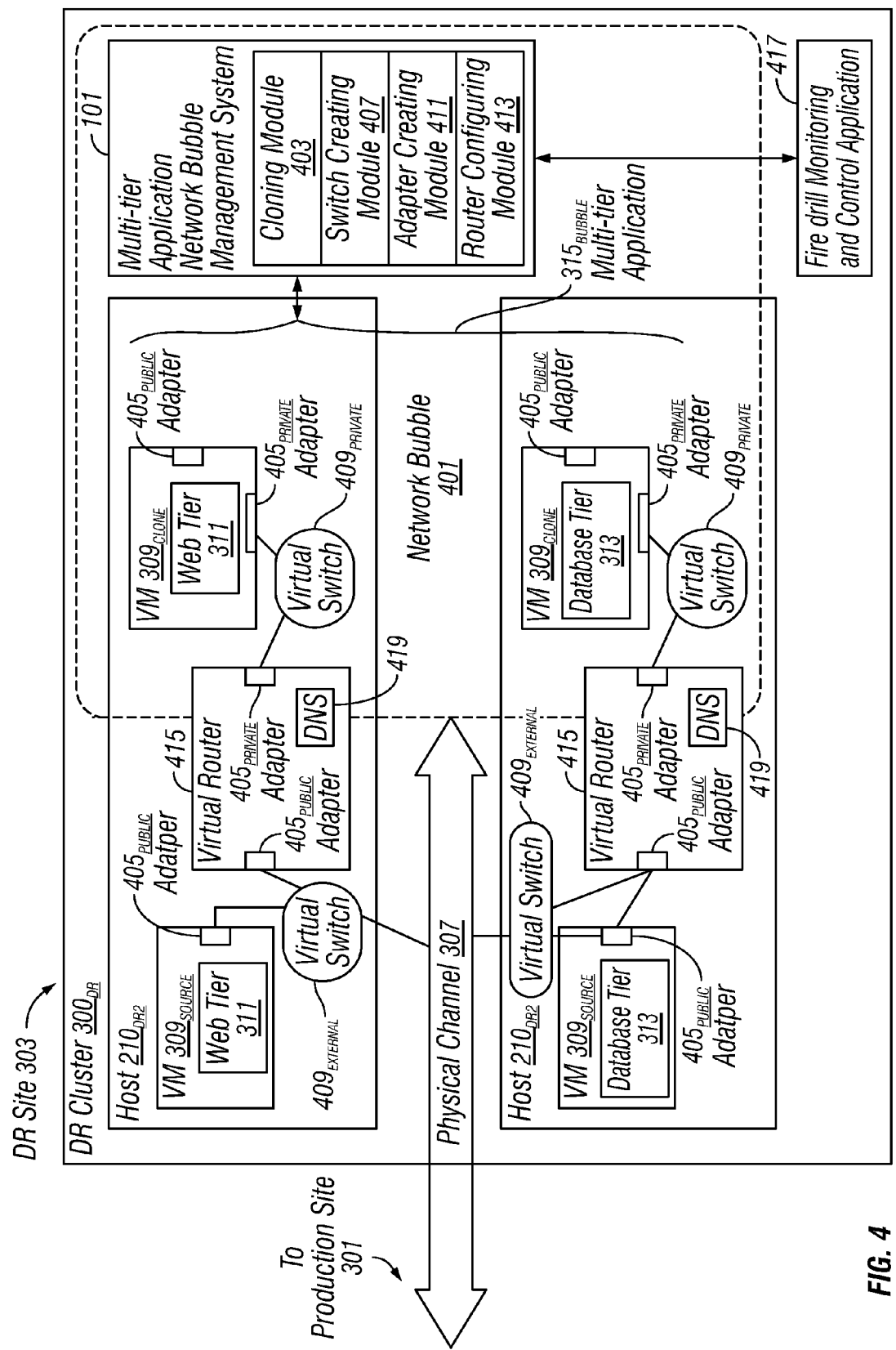
FIG. 4 is a block diagram of the functional modules of a multi-tier application network bubble management system, according to some embodiments.

FIG. 4 shows the operation of the functional modules of the multi-tier application network bubble management system 101, according to some embodiments. As illustrated in FIG. 4, the multi-tier application network bubble management system 101 executes in the DR cluster $300_{DR}$ at the DR site 303. As noted above in conjunction with FIG. 3, the DR cluster $300_{DR}$ maintains the host computers $210_{DR1}$ and $210_{DR2}$, VMs 309 and replicated data to start up and run the multi-tier application 315 should failover from the production site 301 be necessary. However, because the multi-tiered application 315 is executing on the production site 301, bringing up and running the multi-tiered application 315 on the DR site 303 for a fire drill without using the special functionality of the multi-tier application network bubble management system 101 described herein would result in IP and/or DNS hostname conflicts between components used by the tiers of the two separate instantiations of the application 315 at the separate production and DR sites, as well as crosstalk between the separate instantiations of the multi-tiered application 315.

To enable a fire drill test on the DR site 303 and simultaneously keep the DR site available for failover, while the multi-tiered application 315 is still running on the production site 301, the multi-tier application network bubble management system 101 creates a network bubble 401 of the VMs 309 used by the multi-tiered application 315. The fire drill is conducted in the network bubble 401, without causing conflicts or crosstalk with the multi-tier application 315 on the production site 301. This is done without taking the DR site level infrastructure needed for the failover of the multi-tiered application 315 offline, in case the production site 301 goes down while the fire drill is being conducted.

To create the network bubble 401, first a VM cloning module 403 of the multi-tier application network bubble management system 101 clones each of the multi-tier application's VM 309 on the DR site 303. In other words, for each host 210 that is in place on the DR cluster $300_{DR}$ to support failover of the multi-tiered application 315 from the production site 301, the VMs 309 on that host 210 are cloned. For example, FIG. 4 illustrates two hosts $210_{DR1}$ and $210_{DR2}$, each running one VM 309, one for the web tier 311 of the multi-tiered application 315 and the other for the database tier 313. As explained above, in other embodiments more tiers and/or different architectures can be deployed as desired. For example, an individual tier of the multi-tier application 315 can be instantiated on a subnet consisting of multiple hosts 210 or multiple VMs 309 running in conjunction with a hypervisor (not illustrated) on a single host 210. Another possible architecture is for separate tiers to be instantiated on separate VMs 309 running on a single host 210. Regardless, cloning a VM 309 results in a source VM $309_{SOURCE}$ and a cloned VM $309_{CLONE}$. The source VMs $309_{SOURCE}$ are connected to the physical channel 307 using their known, public IP addresses, and thus remain available for failover of the multi-tiered application 315 from the production site 301. Each cloned VM $309_{CLONE}$ inherits a virtual adapter 405 (e.g., a virtual NIC) from its corresponding source VM $309_{SOURCE}$ with the same public IP address. However, these inherited adapters 405 and public IP addresses are not used on the cloned VMs $309_{CLONE}$. Instead, as described below, cloned VMs $309_{CLONE}$ use a second virtual adapter 405 with a private IP address to communicate with each other in the network bubble 401.

The VM cloning module 403 can use different methodologies to create cloned VMs $309_{CLONE}$ in different embodiments. For example, it can take a read-write snapshot of the corresponding source VM $309_{SOURCE}$ and then bring up the cloned VM $309_{CLONE}$ on this snapshot disk. On each host 210 on which one or more cloned VMs $309_{CLONE}$ are created, a virtual switch creating module 407 of the multi-tier application network bubble management system 101 creates a virtual switch 409, which is used by the cloned VMs $309_{CLONE}$ for communication in the network bubble 401 as described in detail below.

A virtual adapter creating module 411 of the multi-tier application network bubble management system 101 creates the above-referenced second virtual adapter 405 on each cloned VM $309_{CLONE}$ and assigns it an IP address distinct from the public IP address of its source VM $309_{SOURCE}$. This distinct IP address is used within the network bubble 401 only, and can be thought of a private IP address. The new virtual adapter 405 created on the cloned VM $309_{CLONE}$ communicates through the virtual switch 409 created on the host 210, using the private IP address. Note that applications running on a cloned VM $309_{CLONE}$ are not modified, and engage in network communication using the public IP address at the application level. However, a kernel level module (not specifically illustrated) of the cloned VM $309_{CLONE}$ converts the public IP address to their private IP address for outgoing communication (and where appropriate back again for incoming), so that applications on cloned VMs $309_{CLONE}$ actually communicate within the network bubble 401 using the private IP addresses and the virtual switch 409, rather than over the physical channel 307 using the public IP addresses. In different embodiments this IP address translation can be performed by different components in the network protocol stack on the VM $309_{CLONE}$ below the application level. Note that the source VMs $309_{SOURCE}$ on the DR site 303 can be spanned across multiple hosts 210 (and/or across one or more hypervisor(s)), and thus the same is true for the corresponding cloned VMs $309_{CLONE}$.

On each host 210 used by the multi-tiered application 315, a cloned VM $309_{CLONE}$ is created for each source VM $309_{SOURCE}$, with the cloned VM $309_{CLONE}$ using its private IP address to communicate in the network bubble 401 through the virtual switch 409, and thus not being visible to the physical channel 307. On the other hand, the corresponding source VM $309_{SOURCE}$ uses the public IP address, and is visible on the physical channel 307. Therefore, the collection of source VMs $309_{SOURCE}$ running on the hosts 210 of the DR cluster $300_{DR}$ are available for failing over the multi-tiered application 315 from the production cluster $300_{PRODUCTION}$, in the event of a disaster level failure at the production site 301. In order to maintain the two sets of VMs 309 simultaneously and manage their network communication on the corresponding public and private IP addresses, a virtual router configuring module 413 of the multi-tier application network bubble management system 101 configures and deploys a virtual router 415 on the host 210 of each tier.

The virtual adapter creating module 411 creates two virtual adapters 405 (i.e., virtual NICs) on each virtual router 415. The two virtual adapters 405 have two separate IP addresses, one of which is public and visible on the physical channel 307, the other of which is private, not visible on the physical channel 307, but instead used for communication in the network bubble 401. The public virtual adapter $405_{PUBLIC}$ is used for connection to the physical channel 307, and the private virtual adapter $405_{PRIVATE}$ is connected to the virtual switch 409 on the host 210. As noted above, the cloned VMs $309_{CLONE}$ inherit the same IP settings as the corresponding source VMs $309_{SOURCE}$, but are not bought online directly on the same physical channel 307. Instead, by using the separate virtual adapters 405 created on the cloned VMs $309_{CLONE}$ with their private IP addresses to communicate through the virtual switch 409 to the private virtual adapter $405_{PRIVATE}$ on the virtual router 415, the network traffic between the cloned VMs $309_{CLONE}$ is masqueraded from the physical channel 307, and thus no IP address conflicts occur.

In one embodiment, the virtual routers 415 are implemented in the form of DD-WRT aftermarket open source firmware running on a software router, and configured to provide both the public and private virtual adapters 405 and route the network traffic accordingly. In other embodiments, other implementations are used, for example, a VM 309 running general purpose Linux and repurposed to provide two separate virtual adapters 405 along with underlying IP address translation and routing rules so as to manage traffic both on the public DR site-level network which is connected to the physical channel 307, and in the network bubble 401 which is invisible to the physical channel 307.

Each source VM $309_{SOURCE}$ communicates with the physical channel 307 using the external virtual switch $409_{EXTERNAL}$, which is provided by default by the hypervisor for communication with the physical channel 307. As illustrated in FIG. 4, both the source VMs $309_{SOURCE}$, and the public adapters $405_{PUBLIC}$ of the virtual routers 415 are connected to these external virtual switches 409 EXTERNAL to have physical channel 307 access. By contrast, the created, private virtual switch $409_{PRIVATE}$ is used only inside the network bubble 401 by cloned VMs $309_{CLONED}$, and can be thought of as an internal virtual switch 409.

By contrast, the cloned VMs $303_{CLONE}$ communicate with each other using the private IP addresses, and are thus isolated from the source VMs $303_{SOURCE}$ and the physical channel 307. For example, the cloned web tier VM $309_{CLONE}$ would communicate with the cloned database tier VM $309_{CLONE}$ through the virtual switch 409 on the web tier host 210, to the private virtual adapter $405_{PRIVATE}$ of the virtual router 415 on the web tier host 210. The web tier virtual router 415 would forward the packets to the database tier virtual router 415, which communicates using its private virtual adapter $405_{PRIVATE}$ to the virtual switch 409 on the database tier host 210, and in turn to the cloned database tier VM $309_{CLONE}$, using the private IP addresses. The isolated virtual switch 409 on each host 210 provides connectivity between cloned VMs $303_{SOURCE}$ and the virtual router 415. Thus, the cloned VMs $303_{CLONE}$ talk to the virtual router 415 in the private, network bubble 401, while the underlying routers themselves talk to each other directly on the public network. Because the routers actually communicate with each other using their own public IP addresses, the cloned VM's private IP addresses are hidden from the outside world and the physical channel 307. The private IP addresses and virtual router 415 essentially provide a tunnel-like feature feature through which cloned VMs $303_{CLONE}$ forward packets for other cloned VMs $303_{CLONE}$ using the virtual routers 415 in the path. When a virtual router 415 receives a packet from the network bubble 401, it forwards it to appropriate destination virtual router 415 based on the forwarding rules. The virtual router 415 on the destination host 210 receives the packet, and forwards it through the network bubble 401 by sending it to the destination cloned $303_{CLONE}$ on the tier host 210, via the virtual switch and private IP address.

The DR Cluster $300_{DR}$ is configured to simultaneously rout packets between the public, source VMs $309_{SOURCE}$ on the physical channel 307 and between the cloned VMs $309_{CLONE}$ in the network bubble 401. This scenario prevents IP address conflicts and application cross talk, and leaves the DR cluster $300_{DR}$ available for real failover from the production site 301 while the fire drill test is conducted in the network bubble 401.

A typical multi-tier application 315 sometimes requires communication with outside entities, such as a lightweight directory access protocol (LDAP) server (not illustrated) for authentication, and such. For this reason, the virtual routers 415 can be configured with firewall settings to allow cloned VMs $309_{CLONE}$ of the multi-tier application 315 running inside the network bubble 401 to make read-only queries to specific outside servers 105 and the like. The virtual routers 415 can be configured to manage these queries and perform the necessary IP address conversions, as the cloned VM's private IP addresses have no meaning outside of the network bubble 401. Hostname resolution is also required for the cloned VMs $309_{CLONE}$, but it is not desirable to maintain a cloned DNS server inside the network bubble 401. For this reason, the virtual routers 415 are further configured to provide DNS service 419 to the cloned VMs $309_{CLONE}$, thereby preventing DNS conflicts. For example, DD-WRT supports inbuilt DNS service 419 at a virtual router level.

Virtual router level firewall rules are also configured to allow the multi-tier application network bubble management system 101 to communicate from inside the network bubble 401 with an outside fire drill monitoring and control application 417, which allows an administrator or the like to start, track and monitor a fire drill test of the multi-tier application 315 in the network bubble 401. For example, the multi-tier application network bubble management system 101 can expose a set of APIs to perform the fire drill test and report on its status. The administrator operating the outside application 417 takes actions (e.g., by interacting with a GUI or other interface) which cause the application 417 to call the APIs, which trigger requests to the multi-tier application network bubble management system 101 to start, otherwise control or report specific or general status information concerning the fire drill test. The multi-tier application network bubble management system 101 receives these requests through the virtual router 415, takes the appropriate actions within the network bubble 401, and uses the virtual router 415 to return the appropriate status information to the monitoring and control application 417. The monitoring and control application 417 can output the desired status information to the administrator in real time as the fire drill test occurs, for example by depicting the information graphically on a display screen.

Using the functionality described above, a network bubble 401 is created in which a multi-tier application 315 can be brought up and subject to a comprehensive fire drill test on the DR site 303, thereby testing the readiness of the DR site configuration for the multi-tier application 315. The network bubble 401, and hence the fire drill test of the multi-tier application 315, can be spanned across different subnets and across multiple hosts 210. The multi-tier application network bubble management system 101 enables the fire drill to occur on the DR site 303 while the multi-tier application 315 is running on the production site 301. This provides for a most vital and comprehensive check that guarantees the readiness of the DR site 303 configuration in the event of a disaster at the production site 301 requiring failover of the multi-tier application 315.

The multi-tier application network bubble management system 101 is agnostic to the virtualization environment/vendor, operating holistically at the multi-tier application level. The resulting framework is flexible, and supports any type of multi-tier application 315 stack/platform. The multi-tier application network bubble management system 101 enables a DR readiness testing fire drill for any multi-tier application 315, with zero down time for application 315 on the production site 301, no crosstalk with between the DR site 303 and the production site 301 when fire drill is in progress and no IP address or hostname conflicts. In order to provide this functionality, the multi-tier application network bubble management system 101 creates a network bubble 401 that is invisible to the outside world, but wherein virtual router level firewall rules enable authorized queries from inside the network bubble 401 to specific outside entities (e.g., LDAP server authorization queries), as well as communication with an outside monitoring and control application 417 or the like, to enable an authorized administrator to start and monitor the fire drill. Furthermore, host name resolution is provided at a virtual router level inside the network bubble 401. An additional significant advantage provided by the multi-tier application network bubble management system 101 is that the multi-tier application 315 can still be failed over to the DR site 303 in the event of a production site 301 disaster, even while the fire drill on the DR site 303 is in progress.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for maintaining a production site containing multiple virtual machines distributed across multiple host computers on which a first instance of a multi-tiered application executes, maintaining a physically disparate disaster recovery site containing corresponding multiple virtual machines distributed across corresponding multiple host computers, to which the multi-tiered application can be failed over in the event of a disaster level failure at the production site, and enabling a second instance of the multi-tiered application to be brought up, executed and tested on the disaster recovery site, while continuing to execute the first instance of the multi-tiered application on the production site, with the disaster recovery site simultaneously remaining available for failover of the multi-tiered application from the production site, wherein the production site and the disaster recovery site are communicatively coupled over a physical channel, the method comprising the steps of:

on each host computer on the disaster recovery site maintained to failover the multi-tiered application from the production site, cloning each virtual machine executing on the each host computer, wherein cloning a virtual machine executing on a host computer results in a source virtual machine and a corresponding cloned virtual machine both executing on the host computer and each having a copy of a first virtual adapter with a public IP address configured for communicating on the physical channel;

on each host computer on the disaster recovery site on which at least one virtual machine is cloned, creating a virtual switch configured for cloned virtual machines to communicate with each other without being visible on the physical channel;

for each cloned virtual machine on each host computer on the disaster recovery site, creating a second virtual adapter with a private IP address not visible on the physical channel, wherein the each cloned virtual machine does not communicate externally using its first virtual adapter with the public IP address but instead communicates externally using its second virtual adapter with the private IP address;

on the each host computer on the disaster recovery site on which at least one virtual machine is cloned, configuring a virtual router with a public virtual adapter having a public IP address that is visible on the physical channel, and with a private virtual adapter having a private IP address that is not visible on the physical channel, wherein the public virtual adapter of the virtual router on a given host computer is communicatively coupled to the physical channel and the private virtual adapter of the virtual router on the given host computer is communicatively coupled to the virtual switch configured for cloned virtual machines on the given host computer;

wherein the source virtual machines distributed across the multiple host computers on the disaster recovery site are configured to communicate with each other using the public IP addresses over the physical channel, via the virtual switches on the host computers, are visible on the physical channel and are available for the failover of the multi-tiered application from the production site; and wherein the cloned virtual machines distributed across the multiple host computers on the disaster recovery site are configured to communicate with each other using the private IP addresses via the virtual switches and private virtual adapters of the virtual routers, and form a network bubble on the disaster recovery site, the network bubble not being visible on the physical channel.

2. The method of claim 1 further comprising:

using virtual router level domain name service functionality to provide host name resolution for the cloned virtual machines within the network bubble, thereby preventing hostname conflicts with entities outside of the network bubble.

3. The method of claim 2 further comprising:

bringing-up, executing and testing the second instance of the multi-tiered application on the cloned virtual machines in the network bubble, wherein the second instance of the multi-tiered application and the cloned virtual machines are not visible on the physical channel, wherein the cloned virtual machines in the network bubble communicate with each other using the private IP addresses via the virtual switches and private virtual adapters of the virtual routers thereby preventing IP address conflicts with entities outside of the network bubble and preventing crosstalk between the second instance of the multi-tiered application executing in the network bubble and the first instance of the multi-tiered application executing on the production site.

4. The method of claim 1 wherein:

at least one tier of the multi-tiered application is distributed across the multiple host computers.

5. The method of claim 1 wherein:

at least one tier of the multi-tiered application is distributed across the multiple virtual machines running on a single hypervisor on a single host computer.

6. The method of claim 1 wherein:

at least one tier of the multi-tiered application is configured for execution on a single virtual machine running on a single host computer.

7. The method of claim 1 wherein the cloning the virtual machine executing on the host computer further comprises:

taking a read-only snapshot of the source virtual machine; and using the read-only snapshot to bring-up the corresponding cloned virtual machine.

8. The method of claim 1 wherein a cloned virtual machine not communicating externally using its first virtual adapter with the public IP address but instead communicating externally using its second virtual adapter with the private IP address further comprises:
  executing unmodified applications on the cloned virtual machine, such that the unmodified applications use the public IP address for network communication; and
  intercepting network communication from a point in a network protocol stack below an application level and converting the public source IP address in outgoing network communication to a private source IP address, converting a private destination IP address in incoming network communication to a public destination IP address, and using the second virtual adapter for external communication.

9. The method of claim 1 wherein the configuring the virtual router with the public virtual adapter having the public IP address that is visible on the physical channel, and with the private virtual adapter having the private IP address that is not visible on the physical channel, further comprises:
  building a soft router using a general purpose operating system, the configuring providing two separate virtual adapters along with underlying IP address translation and routing rules configured to manage traffic both on a public disaster recovery site level network which is connected to the physical channel, and in the network bubble which is invisible to the physical channel.

10. The method of claim 1 wherein the configuring the virtual router with the public virtual adapter having the public IP address that is visible on the physical channel, and with the private virtual adapter having the private IP address that is not visible on the physical channel, further comprises:
  running a general purpose operating system on a soft router; and
  configuring a network to provide the public virtual adapter with the public IP address and to provide the private virtual adapter with the private IP address.

11. The method of claim 1 further comprising:
  performing network communication in the bubble network from a first cloned virtual machine on a first host computer corresponding to a first tier of the multi-tiered application to a second cloned virtual machine on a second host computer corresponding to a second tier of the multi-tiered application, using the private IP addresses and second virtual network adapters of the first and the second cloned virtual machines, the virtual switches of the first and the second host computers, and private virtual adapters of the virtual routers on the first and the second host computers.

12. The method of claim 1 wherein:
  each virtual router on each host computer is configured to route packets between source host computers on the physical channel and to simultaneously route packets between the cloned virtual machines in the network bubble.

13. The method of claim 1 further comprising:
  configuring virtual routers with firewall settings to allow cloned virtual machines executing in the network bubble to make read-only queries to at least one specific server outside of the network bubble; and
  routing network traffic between a specific virtual machine in the network bubble and a server outside of the network bubble according to the firewall settings, wherein the routing the network traffic further comprises using the private IP address of the specific virtual machine within the network bubble and using the public IP address of the specific virtual machine outside of the network bubble.

14. The method of claim 1 further comprising:
  configuring virtual routers with firewall settings to allow cloned virtual machines executing in the network bubble to communicate with a fire drill monitoring and control application executing outside of the network bubble.

15. The method of claim 14 further comprising:
  exposing a set of Application Program Interfaces (APIs) to perform a fire drill and report on its status.

16. The method of claim 14 further comprising:
  receiving, by a virtual router, a request to start a fire drill test of the multi-tiered application in the network bubble, from the fire drill monitoring and control application executing outside of the network bubble; and
  responsive to receiving the request, bringing-up, executing and testing the second instance of the multi-tiered application on the cloned virtual machines in the network bubble.

17. The method of claim 14 further comprising:
  bringing-up, executing and testing the second instance of the multi-tiered application on the cloned virtual machines in the network bubble; and
  transmitting, by at least one virtual router, status information concerning executing the second instance of the multi-tiered application on the cloned virtual machines in the network bubble, to the fire drill monitoring and control application executing outside of the network bubble.

18. The method of claim 1 further comprising:
  using virtual router level domain name service functionality to provide host name resolution for the cloned virtual machines within the network bubble, thereby preventing hostname conflicts with entities outside of the network bubble;
  bringing-up, executing and testing the second instance of the multi-tiered application on the cloned virtual machines in the network bubble, wherein the second instance of the multi-tiered application and the cloned virtual machines are not visible on the physical channel, wherein the cloned virtual machines in the network bubble communicate with each other using the private IP addresses via the virtual switches and private virtual adapters of the virtual routers thereby preventing IP address conflicts with entities outside of the network bubble and preventing crosstalk between the second instance of the multi-tiered application executing in the network bubble and the first instance of the multi-tiered application;
  failing over the first instance of the multi-tiered application from the production site to the source virtual machines distributed across the multiple host computers on the disaster recovery site; and
  executing the first instance of the multi-tiered application on the source virtual machines distributed across the multiple host computers on the disaster recovery site, the source virtual machines communicating with each other using the public IP addresses over the physical channel, via the virtual switches on the host computers, while the second instance of the multi-tiered application executes in the network bubble on the disaster recovery site.

19. At least one non-transitory computer readable medium for maintaining a production site containing multiple virtual machines distributed across multiple host computers on which a first instance of a multi-tiered application executes, maintaining a physically disparate disaster recovery site containing corresponding multiple virtual machines distributed across corresponding multiple host computers, to which the multi-tiered application can be failed over in the event of a disaster level failure at the production site, and enabling a second instance of the multi-tiered application to be brought up, executed and tested on the disaster recovery site, while continuing to execute the first instance of the multi-tiered application on the production site, with the disaster recovery site simultaneously remaining available for failover of the multi-tiered application from the production site, wherein the production site and the disaster recovery site are communicatively coupled over a physical channel, the at least one non-transitory computer readable medium storing computer executable instructions that, when loaded into computer memory and executed by at least one processor of a computing device, cause the computing device to perform the following steps:

- on each host computer on the disaster recovery site maintained to failover the multi-tiered application from the production site, cloning each virtual machine executing on the each host computer, wherein cloning a virtual machine executing on a host computer results in a source virtual machine and a corresponding cloned virtual machine both executing on the host computer and each having a copy of a first virtual adapter with a public IP address configured for communicating on the physical channel;
- on each host computer on the disaster recovery site on which at least one virtual machine is cloned, creating a virtual switch configured for cloned virtual machines to communicate with each other without being visible on the physical channel;
- for each cloned virtual machine on each host computer on the disaster recovery site, creating a second virtual adapter with a private IP address not visible on the physical channel, wherein the each cloned virtual machine does not communicate externally using its first virtual adapter with the public IP address but instead communicates externally using its second virtual adapter with the private IP address;
- on the each host computer on the disaster recovery site on which at least one virtual machine is cloned, configuring a virtual router with a public virtual adapter having a public IP address that is visible on the physical channel, and with a private virtual adapter having a private IP address that is not visible on the physical channel, wherein the public virtual adapter of the virtual router on a given host computer is communicatively coupled to the physical channel and the private virtual adapter of the virtual router on the given host computer is communicatively coupled to the virtual switch on the given host computer;
- wherein the source virtual machines distributed across the multiple host computers on the disaster recovery site are configured to communicate with each other using the public IP addresses over the physical channel, via the virtual switches on the host computers, are visible on the physical channel and are available for the failover of the multi-tiered application from the production site; and
- wherein the cloned virtual machines distributed across the multiple host computers on the disaster recovery site are configured to communicate with each other using the private IP addresses via the virtual switches and private virtual adapters of the virtual routers, and form a network bubble on the disaster recovery site, the network bubble not being visible on the physical channel.

20. A computer system for maintaining a production site containing multiple virtual machines distributed across multiple host computers on which a first instance of a multi-tiered application executes, maintaining a physically disparate disaster recovery site containing corresponding multiple virtual machines distributed across corresponding multiple host computers, to which the multi-tiered application can be failed over in the event of a disaster level failure at the production site, and enabling a second instance of the multi-tiered application to be brought up, executed and tested on the disaster recovery site, while continuing to execute the first instance of the multi-tiered application on the production site, with the disaster recovery site simultaneously remaining available for failover of the multi-tiered application from the production site, wherein the production site and the disaster recovery site are communicatively coupled over a physical channel, the computer system comprising:

- a processor;
- system memory;
- a virtual machine (VM) cloning module residing in the system memory, the VM cloning module being programmed to clone each virtual machine executing on each host computer on the disaster recovery site maintained to failover the multi-tiered application from the production site, wherein cloning a virtual machine executing on a host computer results in a source virtual machine and a corresponding cloned virtual machine both executing on the host computer and each having a copy of a first virtual adapter with a public IP address configured for communicating on the physical channel;
- a virtual switch creating module residing in the system memory, the virtual switch creating module being programmed to create a virtual switch configured for cloned virtual machines to communicate with each other without being visible on the physical channel, on each host computer on the disaster recovery site on which at least one virtual machine is cloned;
- a virtual adapter creating module residing in the system memory, the virtual adapter creating module being programmed to create a second virtual adapter with a private IP address not visible on the physical channel for each cloned virtual machine on each host computer on the disaster recovery site, wherein the each cloned virtual machine does not communicate externally using its first virtual adapter with the public IP address but instead communicates externally using its second virtual adapter with the private IP address;
- a virtual router configuring module residing in the system memory, the virtual router configuring module being programmed to configure a virtual router with a public virtual adapter having a public IP address that is visible on the physical channel, and with a private virtual adapter having a private IP address that is not visible on the physical channel, on the each host computer on the disaster recovery site on which at least one virtual machine is cloned, wherein the public virtual adapter of the virtual router on a given host computer is communicatively coupled to the physical channel and the private virtual adapter of the virtual router on the given host computer is communicatively coupled to the virtual switch on the given host computer;
- wherein the source virtual machines distributed across the multiple host computers on the disaster recovery site are configured to communicate with each other using the public IP addresses over the physical channel, via the virtual switches on the host computer, are visible on the physical channel and are available for the failover of the multi-tiered application from the production site; and wherein the cloned virtual machines distributed across the multiple host computers on the disaster recovery site are configured to communicate with each other using the private IP addresses via the virtual switches and private virtual adapters of the virtual routers, and form a network bubble on the disaster recovery site, the network bubble not being visible on the physical channel.

* * * * *